Aug. 3, 1965    J. A. MARCHAND    3,198,472
HORSE FOR THE TRANSPORT OF MATERIALS IN SHEET FORM
Filed Dec. 7, 1962

INVENTOR
JEAN ALBERT MARCHAND

BY *Corey, Hart, Stample*
ATTORNEYS

United States Patent Office 3,198,472
Patented Aug. 3, 1965

3,198,472
HORSE FOR TRANSPORT OF MATERIALS
IN SHEET FORM
Jean Albert Marchand, Charleroi, Belgium, assignor to Glaverbel, Brussels, Belgium, a Belgian company
Filed Dec. 7, 1962, Ser. No. 242,977
Claims priority, application Belgium, Dec. 19, 1961, 487,794, Patent 611,740
7 Claims. (Cl. 248—346)

The present invention concerns an improved horse for the bulk transport and storage of materials in sheet form.

U.S. Patent 2,978,270 of April 4, 1961, relates to a horse for the bulk transport and storage of materials in sheet form, which comprises a frame having a face inclined in relation to the vertical and including a ledge at its lower end and a support member overhanging the load at its upper end to define a volume which contains the sheets disposed against the substantially horizontal face of the ledge and resting against the face of the frame, suspension members fixed to the support member, feet forming a supporting base forming a space between the ground and the ledge to permit the nesting of the empty frames by engagement of one or more feet of one frame below the preceding frame, the suspension members being so disposed that the vertical plane passing through the centre of gravity of the loaded or unloaded horse extends approximately through the said suspension members and falls within the said base. The frame comprises oblique uprights or posts, each fitted in a foot and provided at the top with a horizontal support so that the assembly has the form of a Z, and a supporting structure connecting the oblique posts and constituting the inclined face against which there rest the sheets bearing by their edges on the ledge extending along the lower edge of this face.

In use, it has been found that these horses may have a disadvantage at the time of storing or loading them in a space defined by vertical walls, for example in a wagon or in a ship. The size of the horse may be compared with that of a parallelepiped, of which the thickness is approximately equal to the length of the feet. This size is reduced by the engagement of the feet of one frame below the preceding frame, but the first horse does not profit from this advantage and it maintains its full size, since the rear ends of its feet are positioned against the vertical wall and its top end comes close to the vertical plane of the said wall. On the other hand, on completion of the loading, there frequently remains between the last loaded horse and the adjacent wall, a space which is insufficient for a horse to descend thereinto.

The improvement according to the present invention makes it possible to reduce the size of the horses so as to utilize to the maximum the space which is reserved for them between two vertical walls.

According to the invention, each of the feet of the horse comprises at least one movable part capable of being lowered beneath the fixed part. The movable part is preferably pivoted to the fixed part by a hinge. The upper face of the movable part is advantageously inclined towards the rear so as to place the frame in an approximately vertical position when the latter is disposed on the movable part lowered beneath the fixed part of the foot. Thus, the length of the foot is reduced by about half and the volume of the parallelpiped occupied by the erected frame is substantially less than when the movable part of the foot is in alignment with the fixed part, the frame is inclined and the horse operates in the manner which has been described in the U.S. Patent 2,978,270 of April 4, 1961. The movable part of the foot comprises locking means which hold it in the chosen position, whether or not lowered. The movable part is advantageously locked in the horizontal extension of the fixed part by a wedge sliding inside the foot and at the same time reinforcing the resistance of the latter. In the lowered position, the movable part is locked beneath the fixed part by a clip of hairpin form.

The accompanying drawing shows one preferred embodiment of the invention by way of example.

Figure 1:
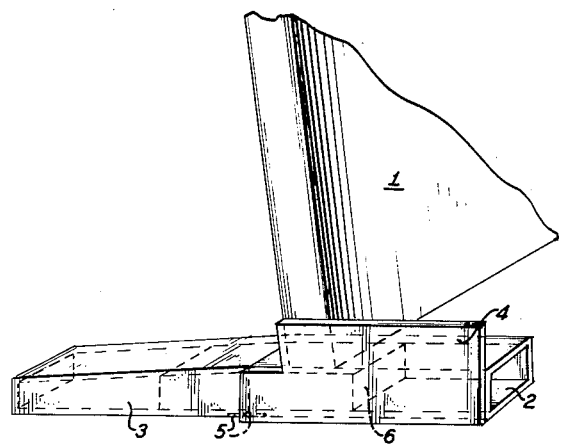
FIG. 1 is an end view of a foot of the horse in the normal position.

According to the invention, the feet of the horse are fast with oblique post 1 and each comprises a fixed part 2, and a movable part 3 disposed end to end. The fixed part 2 is formed by a hollow section of rectangular form fixed to the upright 1 by means of brackets 4. The movable part 3, also formed of a tubular section but of decreasing rectangular form, is fixed to the fixed part by a hinge 5 so that when the two parts are in alignment, the bottoms thereof form a flat supporting base.

Figure 2:
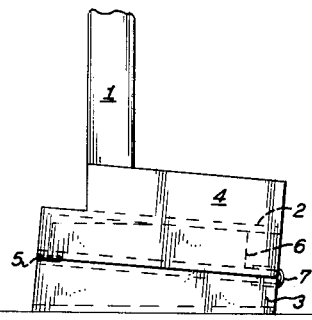
FIG. 2 shows a foot of the same horse in the folded position.

The upper face of the movable part 3 is inclined towards its rear end and forms with the inner face an angle which is approximately equal to that formed between the vertical and the post 1, so as to pring these latter to a substantially vertical position when the movable part 3 of each foot is lowered beneath the fixed part, as shown in FIG. 2, in order to reduce the length of the feet. Although the sheets are wedged against the frame by an appropriate device, it is advantageous to give the angle formed by the two faces of the part 3 a value which is slightly less than that of the angle formed by the post 1 relatively to the vertical, so as to maintain a very slight inclination towards the rear for the post, which inclination assists the support of the sheets on the horse.

A wedge 6, formed by a shaped member sliding inside the fixed part 2, has a wedge-shaped rear end and is engaged in the part 3 in order to hold the latter firmly in the extension of the part 2 (FIG. 1). When stowing the horses in a ship or on a wagon, the wedge 6 is moved completely into the part 2, the part 3 is lowered beneath the part 2, is held in this position by a clip 7 in the form of a hairpin, which makes fast the adjoining faces of the two parts (FIG. 2).

It is obvious that the invention is not limited to the embodiment which has been described and shown by way of example and a departure from the scope thereof will not be made by incorporating modifications thereinto.

I claim:

1. A unitary, self-standing horse for the transport and storage of sheet materials comprising a base, and upright sheet supporting means mounted on said base, said base being composed of a plurality of spaced frame supporting feet adapted to rest horizontally on the ground and extending normally of said sheet supporting means to enable the horse to stand upright by itself, each of said feet including a first horizontal part on which said sheet supporting means is mounted and adapted to rest horizontally on the ground in one of the supporting positions of said horse, and a second horizontal part movable relative to said first part and adapted to form a rearward extension of said first part in said one supporting position of the horse and to form a supporting base for said first part and said sheet supporting means in another of the supporting positions of said horse, said second part being adapted to rest horizontally on the ground in both of said supporting positions of the horse, and means movably connecting said second part to said first part, said second part having a rearwardly and downwardly inclined upper surface in extended position to shift said sheet supporting means from the position in which it is supported in said one supporting position of the horse, when said second part forms a supporting base for said first part and said sheet supporting means.

2. A horse as defined in claim 1, including means to lock said first and movable second parts together in the extended condition of said movable second part.

3. A horse as defined in claim 1, including means to lock said first and movable second parts together when said movable second part forms a supporting base for said first part and said sheet supporting means.

4. A horse as defined in claim 1, including a locking member slidably mounted on said first part and movable into locking engagement with a connected end of said movable second part in the extended condition of said movable second part.

5. A horse as defined in claim 1, in which said first part and said movable second part are of equal length, and means for locking together the forward end of said first part and the rear end of said movable second part when said movable second part forms a supporting base for said first part and said sheet supporting means.

6. A unitary, self-standing horse for the transport and storage of sheet materials comprising a base, and upright sheet supporting means mounted on said base, said base being composed of a plurality of spaced frame supporting feet resting horizontally on the ground and extending forwardly and rearwardly of said sheet supporting means to enable the horse to stand upright by itself, each of said feet including a horizontal fixed part secured to said sheet supporting means and adapted to rest horizontally on the ground in one of the supporting positions of said horse, and a horizontal movable part adapted to form an extension of said fixed part in said one supporting position of the horse and to form a supporting base for said fixed part and said sheet supporting means in another of the supporting positions of said horse, said movable part resting horizontally on the ground in both of said supporting positions of the horse, and means movably connecting said movable part to said fixed part, said sheet supporting means being inclined in relation to the vertical and rearwardly from said base when supported by said fixed and movable parts in the extended condition of said movable part, and said movable part having a rearwardly and downwardly inclined upper surface in extended position formed to shift said sheet supporting means forwardly when said movable part forms a supporting base for said fixed part and said sheet supporting means.

7. A unitary, self-standing horse for the transport and storage of sheet materials comprising a base, and upright sheet supporting means mounted on said base, said base being composed of a plurality of spaced frame supporting feet resting horizontally on the ground, each of said feet including a horizontal fixed part secured to said sheet supporting means so that it extends forwardly and rearwardly of said sheet supporting means and being adapted to rest horizontally on the ground in one of the supporting positions of said horse, and a horizontal movable part adapted to form a rearward extension of said fixed part in said one supporting position of the horse and to form a supporting base for said fixed part and said sheet supporting means in another of the supporting positions of said horse, said movable part resting horizontally on the ground in both of said supporting positions of the horse, and means hingedly connecting the forward end of said movable part to the rear end of said fixed part, said movable part having a rearwardly and downwardly inclined upper surface in extended position to tilt said sheet supporting means from the position in which it is supported in said one supporting position of the horse, when said movable part forms a supporting base for said fixed part and said sheet supporting means.

References Cited by the Examiner

UNITED STATES PATENTS

| 98,079 | 12/69 | Mayer | 108—112 |
| 1,250,308 | 12/17 | Hanson | 24—261 |
| 2,978,270 | 4/61 | Verheggen | 294—67 |

FOREIGN PATENTS

| 811,783 | 8/51 | Germany. |
| 22,204 | 9/12 | Great Britain. |

CLAUDE A. LE ROY, *Primary Examiner.*

RAPHAEL M. LUPO, *Examiner.*